(12) United States Patent
Ukraintsev et al.

(10) Patent No.: US 8,895,923 B2
(45) Date of Patent: Nov. 25, 2014

(54) SYSTEM AND METHOD FOR NON-CONTACT MICROSCOPY FOR THREE-DIMENSIONAL PRE-CHARACTERIZATION OF A SAMPLE FOR FAST AND NON-DESTRUCTIVE ON SAMPLE NAVIGATION DURING NANOPROBING

(71) Applicant: DCG Systems, Inc., Fremont, CA (US)

(72) Inventors: Vladimir A. Ukraintsev, Allen, TX (US); Richard Stallcup, Frisco, TX (US); Sergiy Pryadkin, Plano, TX (US); Mike Berkmyre, Allen, TX (US); John Sanders, Coppell, TX (US)

(73) Assignee: DCG Systems, Inc., Fremont, CA (US)

( * ) Notice: Subject to any disclaimer, the term of this patent is extended or adjusted under 35 U.S.C. 154(b) by 0 days.

(21) Appl. No.: 14/083,438

(22) Filed: Nov. 18, 2013

(65) Prior Publication Data
US 2014/0143912 A1  May 22, 2014

Related U.S. Application Data

(60) Provisional application No. 61/728,759, filed on Nov. 20, 2012.

(51) Int. Cl.
| | | |
|---|---|---|
| H01J 37/26 | (2006.01) | |
| H01J 37/28 | (2006.01) | |
| G02B 27/32 | (2006.01) | |
| G02B 21/00 | (2006.01) | |
| G01Q 60/00 | (2010.01) | |
| G01Q 10/00 | (2010.01) | |
| G01Q 60/38 | (2010.01) | |
| G01Q 60/48 | (2010.01) | |

(52) U.S. Cl.
CPC .............. *G01Q 10/00* (2013.01); *G01Q 60/00* (2013.01); *G01Q 60/38* (2013.01); *G01Q 60/48* (2013.01)
USPC ................ 250/311; 250/491.1; 250/559.44; 850/3; 850/5; 850/33; 359/397; 359/368; 356/620; 430/296

(58) Field of Classification Search
USPC ........... 250/306, 307, 310, 311, 491.1, 492.3, 250/559.39, 559.44; 850/1–3, 5–10, 30, 33, 850/62, 63; 356/237.2, 247, 248, 490, 496, 356/620; 359/368, 397, 896; 430/296, 942
See application file for complete search history.

(56) References Cited

U.S. PATENT DOCUMENTS

| | | |
|---|---|---|
| 5,847,821 A | 12/1998 | Tracy et al. |
| 6,258,326 B1 | 7/2001 | Modlin |
| 7,738,945 B2 | 6/2010 | Fauver et al. |

(Continued)

OTHER PUBLICATIONS

International Search Report and Written Opinion in PCT/US2013/071097, mailed Apr. 14, 2014.

*Primary Examiner* — Bernard E Souw
(74) *Attorney, Agent, or Firm* — Nixon Peabody LLP

(57) ABSTRACT

A system for performing sample probing. The system including an topography microscope configured to receive three-dimensional coordinates for a sample based on at least three fiducial marks; receive the sample mounted in a holder; and navigate to at least a location on the sample based on the at least three fiducial marks and the three-dimensional coordinates.

20 Claims, 3 Drawing Sheets

(56) References Cited

U.S. PATENT DOCUMENTS

| | | | |
|---|---|---|---|
| 7,928,409 B2 * | 4/2011 | Perkins et al. | 250/491.1 |
| 8,387,158 B2 * | 2/2013 | Perkins et al. | 850/6 |
| 8,486,055 B2 * | 7/2013 | Knox et al. | 606/5 |
| 8,617,147 B2 * | 12/2013 | Knox et al. | 606/5 |
| 8,717,673 B2 * | 5/2014 | Selvin et al. | 359/397 |
| 2006/0219953 A1 | 10/2006 | Carleson | |
| 2007/0018099 A1 | 1/2007 | Chitturi et al. | |
| 2009/0242759 A1 | 10/2009 | Bray et al. | |
| 2011/0035848 A1 | 2/2011 | Perkins et al. | |
| 2012/0025075 A1 | 2/2012 | Moore et al. | |
| 2012/0152731 A1 | 6/2012 | Blackwood et al. | |

\* cited by examiner

US 8,895,923 B2

SYSTEM AND METHOD FOR NON-CONTACT MICROSCOPY FOR THREE-DIMENSIONAL PRE-CHARACTERIZATION OF A SAMPLE FOR FAST AND NON-DESTRUCTIVE ON SAMPLE NAVIGATION DURING NANOPROBING

CROSS REFERENCE TO RELATED APPLICATIONS

This application is related to U.S. Patent Application No. 61/728,759 entitled "Use of (Non-contact) Microscopy for 3D Pre-characterization of Sample for Fast and Non-destructive on Sample Navigation during Nanoprobing," by Vladimir A. Ukraintsev, et al., filed on Nov. 20, 2012, which is hereby incorporated by reference in its entirety.

BACKGROUND

1. Field

Embodiments of the invention relate to sample probing. In particular, embodiments of the invention relate to a system and a method for nanoprobing using a scanning probe and a touching probe.

2. Related Art

Nanoprobing is a very broad field of analytical science covering various types of electrical, mechanical, compositional and chemical physical characterization of nano-objects. Examples of nano-objects include nano-electronic devices and their components. Nanoprobing includes, but is not limited to, scanning and touching probing. Electrical probing of a single transistor, memory bitcell and logic elements of integrated circuits ("IC") is used widely to test performance of newly designed ICs and to correct potential problems of the specific IC design or/and overall technology.

Nanoprobing a nano-object located on a sample requires referencing a probe with respect to the sample surface to locate the nano-object at interest. This process is time consuming to ensure the probe is at the proper location on the sample, which adds to the amount of time necessary to probe a nano-object on a sample. Further, sample registration with respect to an existing computer-aided map is challenging because of the small field of view of SEM and other nanoprobing tools. Because of the small field of view more time may be necessary to find features of interest on a sample.

In some cases, it is necessary to move a sample back and forth between sample preparation and nanoprobing tools, such an example is failure analysis of multilayer IC samples. Each time the sample is moved to a new tool requires time to align the sample and locate the feature of interest on the sample. Improper alignment between the tools can result in damage to the sample. Current tools and systems for characterizing a sample do not provide for a fast way to align and navigate to features of interest on a sample.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A system for performing sample probing. The system including an topography microscope configured to receive three-dimensional coordinates for a sample based on at least three fiducial marks; receive the sample mounted in a holder; and navigate to at least a location on the sample based on the at least three fiducial marks and the three-dimensional coordinates.

Other features and advantages of embodiments of the present invention will be apparent from the accompanying drawings and from the detailed description that follows.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Embodiments of the present invention are illustrated by way of example and not limitation in the figures of the accompanying drawings, in which like references indicate similar elements and in which.

DETAILED DESCRIPTION

Figure 1A:
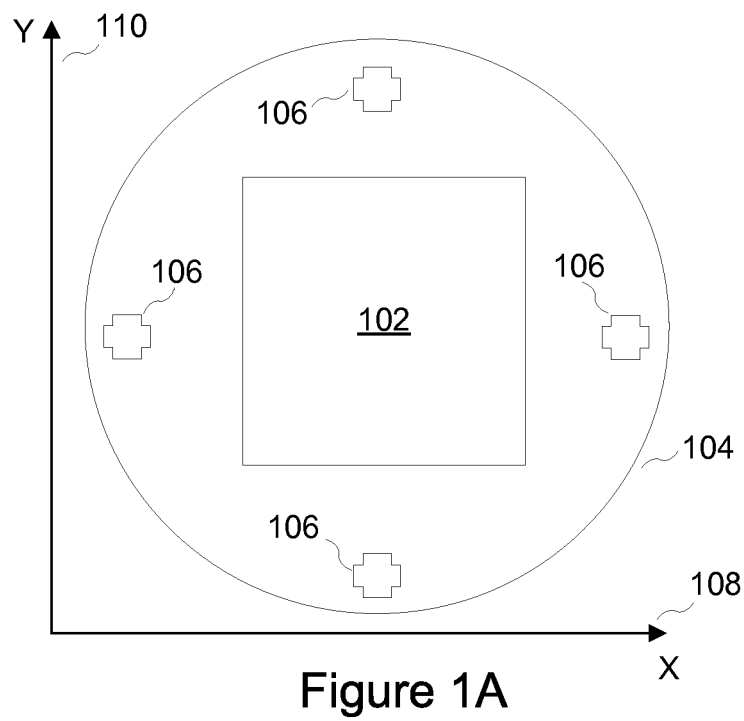
FIG. 1A illustrates a block diagram of a top view of an optical microscope configured to generate a map of a sample according to an embodiment.

Embodiments of a system and a method for three-dimensional characterization of a sample for fast and non-destructive on sample navigation during nanoprobing are described. According to described embodiments, a system includes linked (capable of information exchange) optical and/or topography microscopes used for fast and non-destructive on sample navigation in three dimensions ("3D") during nanoprobing, for example, nanoprobing conducted in a top down scanning electron microscope ("SEM") or in any other two-dimensional nanoprobing tool. The optical and/or topography microscopes can be physically integrated into a nanoprobing tool or the optical and/or topography microscopes can remain as standalone equipment.

For an embodiment, the sample may be transferred from tool to tool using a universal sample holder and fiducial marks. The marks can be prefabricated at a fixed location on the sample holder and/or made on the sample (for example: using a laser marker). This will allow: (a) an accurate, fast and non-destructive (for example: non-contact) topography mapping of the sample in 3D, i.e., Z(X,Y); (b) fast sample two-dimensional, i.e., (X,Y), registration with respect to pre-existing maps, for example, computer-aided design ("CAD") maps of a sample, such as an integrated circuit ("IC"); (c) fast and easy sample transfer between a nanoprober and a sample preparation tool. Examples of sample preparation tools include, but are not limited to, focus ion beam ("FIB") and ion milling tools; and (d) sample characterization using an optical, scanning probe and other techniques including, but not limited to, fast fault search using conductive, capacitance, magnetic and other probe microscopies as well as Raman and fluorescence spectroscopies and other probe-assisted techniques. This probing capability extension (for example, that referred to in sub-element (d) above) will be natural if scanning probe microscopy ("SPM") is selected for sample topography characterization.

The main benefit of the new approach is improvement in nanoprobing throughput (fast navigation to the site of interest and probe descend to a known height, and fast and non-contact probe move from site to site using known sample topography). This will be achieved through pre-characterization of the sample in relatively inexpensive, fast, preferably non-contact optical and/or topography microscopes. Topography microscopes include, but are not limited to, SPMs and AFMs. The secondary benefit is fast and easy access to a powerful arsenal of new characterization, failure analysis, sample preparation and circuit editing techniques. The later will reduce overall time to a result of failure analysis through additional means of fast fault search, reduction of the number of devices to be probed, improvement of sample preparation time for nanoprobing and the following physical failure analysis (such as, transmission electron microscopy ("TEM"), scanning transmission electron microscopy ("STEM"), cross-sectional SEM, etc.).

Figure 1B:
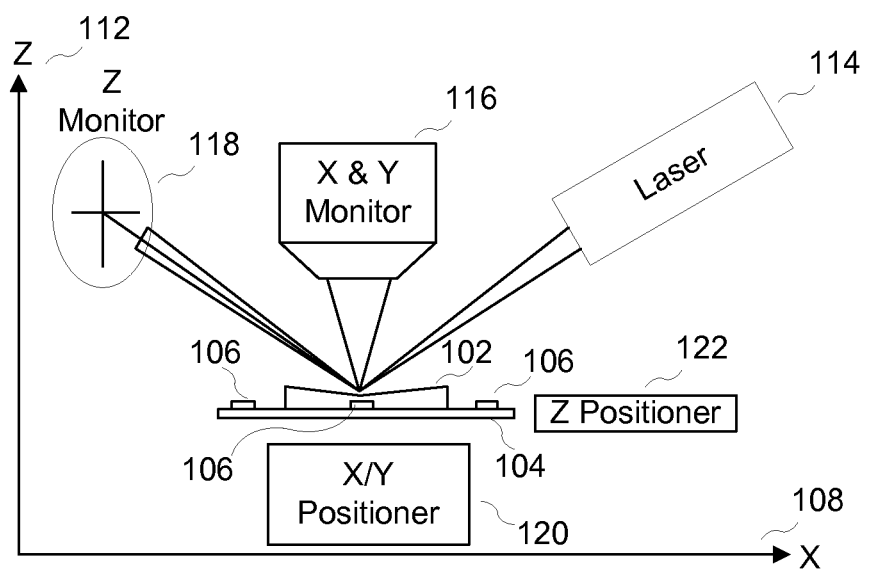
FIG. 1B illustrates a side view of an optical microscope configured to generate a map of a sample according to an embodiment.

FIGS. 1A and 1B illustrate an optical microscope configured to generate a map of a sample according to an embodiment. The optical microscope allows fast and non-destructive Z(X,Y) 3D mapping of the sample with respect to fiducial marks. A complete map of a sample or a few specific locations of interest on a sample (for example: Z1(X1,Y1) and Z2(X2, Y2)) can be pre-characterized. Specifically, FIG. 1A illustrates a sample 102, such as an IC, mounted in a holder 104. A holder 104 may be a universal holder that can be used in multiple tools including, but limited to, sample preparation tools, nanoprobing tools, circuit editing tools, and other tools used to analyze, characterize or prepare a sample. An optical microscope is configured to generate three-dimensional coordinates of the sample 102 based on three or more fiducial marks 106. A fiducial mark 106 may be on the holder 104 and/or on the sample 102. A fiducial mark 106 can be prefabricated at a fixed location on the holder 104 and/or made on the sample 102 (for example, using a laser marker).

As illustrated in FIG. 1A, an optical microscope, according to an embodiment, is configured to generate coordinates, such as the position of one or several locations on a sample 102 on an X-axis 108 and Y-axis 110 with respect to three or more fiducial marks 106. Because the coordinates are referenced to three or more fiducial marks 106, the same tool or another tool using the generated coordinates referenced to the three or more fiducial marks 106 can align the sample 102 and register a probe or other tool at a location based on the generated coordinates.

FIG. 1B illustrates a side view of the optical microscope configured to generate a map of a sample according to an embodiment. The optical microscope is configured to generate three-dimensional coordinates to map the sample 102 based on three or more fiducial marks 106. The optical microscope includes an X/Y positioner 120 configured to move the sample 102 along the X-axis 108 and the Y-axis 110 as the X & Y monitor 116 registers the X and Y position of the sample 102 with respect to three or more fiducial marks 106, using techniques including those known in the art. The optical microscope also includes a Z positioner 122 configured to move the sample 102 along the Z-axis 112. Further, the optical microscope includes a Z monitor 118 that in conjunction with a laser 114 form a laser reflection system. The laser reflection system is configured to register the Z position of the sample along the Z-axis 112 with respect to three or more fiducial marks 106, using techniques including those known in the art.

Depending on the needed spatial resolution of the mapping, various non-contact methods (for example: air gauge and non-contact atomic force microscopy ("AFM")) and contact methods (for example: profilometry and contact AFM) or their combination can be used to pre-characterize a sample by generating three-dimensional coordinates of the sample registered to fiducial marks instead of an optical microscope. It is important that the three-dimensional coordinate information of the sample, Z(X,Y) map, is obtained with respect to three or more fiducial marks placed on the sample holder or the sample. The three-dimensional coordinates of the sample based on the three or more fiducial marks, therefore, can be easily recovered in any other tool which can read or obtain the three-dimensional coordinates, i.e., the XYZ positions, of those fiducial marks. Assuming that the XYZ coordinates of every probe of a tool are known, fast and secure landing of the probes and also site-to-site hoping can be accomplished.

Embodiments of the invention include using an optical microscope, such as that described herein, for automated navigation of a nanoprober on a sample with a complex pattern (for example: an IC). A computer-aided design map of the IC can be registered and used for automated navigation to a desired feature of interest, for example at an X and Y coordinate, i.e., (Xi,Yi). A Z coordinate, Zi, of the feature can be then measured using a three-dimensional (for example: optical) microscope, such as that described herein. Once the three-dimensional coordinates, e.g., Zi(Xi,Yi), with respect to three or more fiducial marks of the feature of interest are known, a nanoprober can be driven to the spot and further higher resolution navigation can be done using SEM or another technique. Navigation on a large and complex IC using a high resolution microscope (for example, SEM, AFM, and etc.) could be difficult and time consuming.

a universal holder are limited to accuracy within a few tens of microns when placing the holder in the next tool. According to an embodiment, an optical microscope and/or a nanoprober can be configured to use automated pattern recognition, using techniques including those known in the art, to further minimize any manual adjustment, for example by an operator, in (X,Y) sample registration and in searching for a location of interest on a sample.

Adding three-dimensional, i.e., Z(X,Y), preferably non-contact sample characterization is useful for SEM based and other nanoprobing approaches since probes should quickly and securely land on a sample's surface without any damage to the probe and/or sample. The mounting of different samples on the same (or similar or matched or pre-characterized) holder, as described herein, provides for quick tip landing on various samples because of the three-dimensional pre-characterization. The use of fast and non-destructive (preferably non-contact) methods (for example: optical) to pre-characterize sample surface in three dimensions with respect to the fiducial marks provides the ability for fast and secure on sample navigation in three dimensions during nanoprobing.

Because, three-dimensional pre-characterization of a sample in a holder with respect to three or more fiducial marks, as described herein, provides the ability to transfer the sample to another tool and to align the sample using the three-dimensional coordinates based on the fiducial marks. This enables fast and easy sample transfer between tools. Transferring a sample between tools may be done manually or may be automated using techniques including those known in the art. Such a technique may be used in failure analysis of multilayer IC samples that may require several sequential nanoprobing sessions conducted at different levels of interconnect. For such an example, the sample is then moved back and forth between sample preparation and nanoprobing tools. Having a universal holder and fiducial marks (for example, placed at pre-agreed locations) visible both in a SEM and an optical microscope simplifies alignment of the sample in a sample preparation tool (for example, a ("FIB")) and alignment of a modified sample after its return back to the nanoprober because of the generation of three-dimensional coordinates based on the fiducial marks. Thus, the tools can use the three-dimensional coordinates in reference to the fiducial marks to locate locations on the sample, such as features of interest.

Another example that benefits from pre-characterization of a sample includes IC functional electrical testing that often gives multiple scenarios for the failure of the IC, such as several suspected devices on the IC located over a significant sample area. Pre-characterizing a sample in a holder using techniques described herein to generate three-dimensional coordinates based on fiducial marks provides the ability for fast fault searching to point to the abnormal devices and, therefore, would reduce the number of devices to be nanoprobed. This provides the ability to move between tools quickly because the time to align a sample in a tool and navigate to locations on the sample using the three-dimensional coordinates based on the fiducial marks reduces the time necessary to set up the tools.

For example, a SPM (for example, a conductive AFM or a scanning capacitance microscopy ("SCM")) could help to isolate abnormal devices with higher risk of failure, which increases throughput and the success rate of nanoprobing. Once a defective device is detected using nanoprobing it is usually sent to physical failure analysis to establish the exact physical cause of the electrical failure. High-resolution transmission electron microscopy ("TEM") or scanning TEM or other cross-sectional techniques (for example, cross-sectional SEM ("XSEM"), SCM, etc.) are often used for the analysis. A 20-50 nanometer ("nm") thin lamella or cross-section should be prepared using FIB at a location often with nanometer accuracy. Again, having a universal holder, fiducial marks visible in FIB tool, and knowing the three-dimensional coordinates of that defected device with respect to the fiducial marks simplifies the alignment of the sample in a holder in the tools, the navigation to and the search for the failed device, and any sample preparation in another tool for further physical failure analysis. The use of a pre-characterized sample in a holder as described herein provides easy access to additional sample characterization techniques (for example, scanning capacitance or magnetic force microscopies) because the three-dimensional coordinates based on the fiducial marks enables fast and easy sample transfer between the tools to localize the defect further down to, for example, 20-50 nm and, therefore, increases the chances of capturing the defect using TEM or other tools of physical failure analysis.

Figure 2:
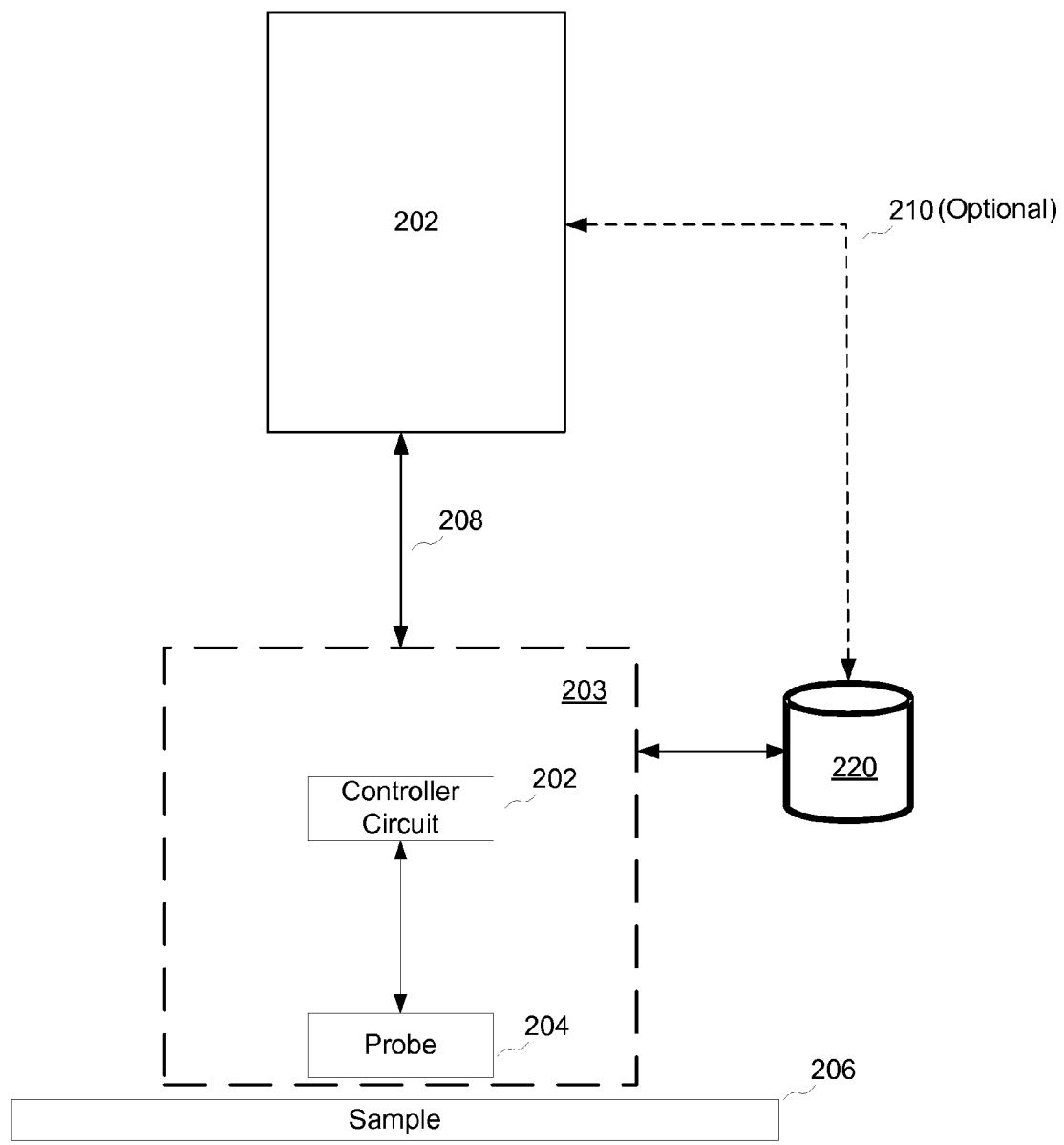
FIG. 2 illustrates a nanoprober linked to a pre-characterization tool according to an embodiment.

FIG. 2 illustrates a nanoprober linked to a three-dimensional pre-characterization tool according to an embodiment. The three-dimensional pre-characterization tool 202, such as an optical microscope as described herein, is linked to or coupled with another tool, such as a nanoprober 203, through a communication link 208. A communication link 208 may be a serial link, a parallel link, a wireless link, an Ethernet link or other communication link including those known in the art. A three-dimensional pre-characterization tool, including those described herein, is configured to communicate coordinates generated based on three or more fiducial marks to the nanoprober 203, using techniques including those described herein. The nanoprober 203 is configured to use the coordinates to navigate to one or more locations of interest on the sample, using techniques including those described herein.

According to an embodiment, nanoprober 203 includes a controller circuit 202 and a probe 204. A controller circuit 202 is coupled with a probe 204. The controller circuit 202 is configured to receive three-dimensional coordinates based on three or more fiducial marks. The controller circuit 202 is configured to align a sample 206 in a holder using the three-dimensional coordinates with reference to three or more fiducial marks on the sample and/or on the holder. The controller circuit 202 is further configured to register the probe 204 at one or more locations of interest on the sample 206 once the sample 206 is aligned to characterize the sample using techniques including those known in the art. According to an embodiment, a controller circuit 202 is coupled with a probe 204 through motors, actuators, gears, sensors, and other mechanical and/or electronic devices used to move or otherwise control a movement of a probe 204 using techniques including those known in the art.

A controller circuit 202 may include one or more components that included, but are not limited to, one or more of any of a microprocessor, a microcontroller, memory, a feedback loop, a sensor, a detector, or other components to alone or with other components to control a movement of a probe 204 including components such as those know in the art. For a particular embodiment, a probe 204 is configured to scan and sample an integrated circuit based on the three-dimensional coordinates received from a pre-characterization tool.

For an embodiment, control of a movement of a probe 204 is based on CAD maps used in addition to the three-dimensional coordinates received. CAD maps may indicate a position of a component, a device, a circuit, an area of interest, or portion thereof on a sample 206. For an example, a system may use a CAD map, which represents a circuit layout and indicates how components and devices in a circuit are connected, to locate a position of a component or device on a sample 206, such as an integrated circuit. A position determined by a CAD map, for example, may be the location of a component or a device on a sample 206 or a portion thereof.

A controller circuit 202, according to an embodiment, may be configured to adjust a force of a probe 204 on a sample 206 and a movement of the probe 204 based on CAD maps in addition to the three-dimensional coordinates received. For example, a CAD database 220, which is not associated with the prober, but which stores CAD data design for fabrication of the sample to be tested, can be used to obtain topographical and design data so as to derive navigation data for the prober. In one example, the NEXS Software Suite, available from DCG Systems, of Fremont, California, is used to provide CAD maps for the prober by directly reading and cross-mapping the physical and logical design data from database 220. The NEXS suite reads the LEF (Library Exchange Format) and DEF (Design Exchange Format) files of the integrated circuit ("IC") design, e.g., GDS2 for the physical layout and Netlist for the logical circuit, and cross correlate it to generate CAD maps.

For an embodiment, a pre-characterization tool 202 may be optionally linked to a CAD database 220 through a database communication link 210 in addition to or instead of a communication link 208 linking the pre-characterization tool with the nanoprober 203. The database communication link 210 may be any type of communication link including those described herein. For such an embodiment, the pre-characterization tool is configured to transmit the generated three-dimensional coordinates to the CAD database 220. Further, a nanoprober 203 may be configured to access or receive three-dimensional coordinates based on one or more fiducial marks from a CAD database 220.

Figure 3:
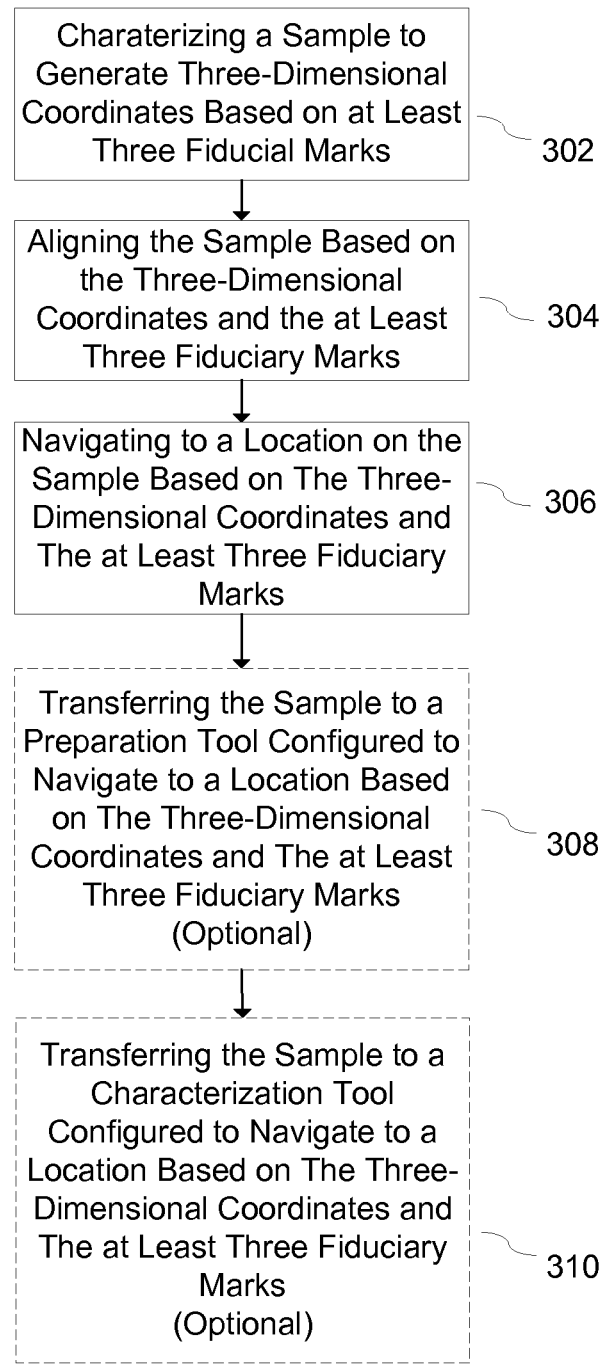
FIG. 3 illustrates a flow diagram of a method for analyzing a sample including registering a probe according to an embodiment.

FIG. 3 illustrates a flow diagram of a method for analyzing a sample including registering a probe according to an embodiment. For an embodiment, a system including those described herein are configured to perform a method for analyzing a sample including registering a probe. The method includes characterizing a sample to generate three-dimensional coordinates based on at least three fiducial marks as illustrated by block 302 in FIG. 3, using techniques including those described herein. As illustrated in block 304, the system aligns the sample based on the three-dimensional coordinates and the at least three fiducial marks. The method also includes navigating to a location on the sample based on the three-dimensional coordinates and the at least three fiducial marks, as illustrated in block 306. At block 308, the method optionally includes transferring the sample to a preparation tool configured to navigate to one or more locations based on the generated three-dimensional coordinates and the at least three fiducial marks, using techniques including those described herein. As illustrated in block 210, the method may optionally include transferring the sample to a characterization tool configured to navigate to one or more locations based on the generated three-dimensional coordinates and the at least three fiducial marks, using techniques including those described herein.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A system for performing sample probing, comprising:
   a topography microscope configured to:
      receive three-dimensional coordinates for a sample based on at least three fiducial marks;
      receive said sample mounted in a holder; and
      navigate to at least a location on said sample based on said at least three fiducial marks and said three-dimensional coordinates.

2. The system of claim 1, further comprising a three-dimensional microscope configured to generate three-dimensional coordinates of said sample based on said at least three fiducial marks.

3. The system of claim 2, wherein said three-dimension microscope is an optical microscope.

4. The system of claim 1, wherein said topography microscope is a scanning-probe microscope.

5. The system of claim 1, wherein said topography microscope is an atomic-force microscope.

6. The system of claim 1, wherein said fiducial mark is on said holder.

7. The system of claim 1, wherein said fiducial mark is on said sample.

8. The system of claim 1, further comprising a preparation tool configured to receive said sample mounted in said holder and configured to navigate to at least said location on said sample based on said at least three fiducial marks and said three-dimensional coordinates.

9. The system of claim 1, wherein said topography microscope is further configured to navigate to said at least one location on said sample based on a computer-aided design map.

10. A method of performing sample probing, comprising:
    characterizing a sample to generate three-dimensional coordinates based on at least three fiducial marks;
    aligning said sample based on said at least three fiduciary marks; and
    navigating to a location on said sample based on said three-dimensional coordinates and said at least three fiduciary marks.

11. The method of claim 10, wherein characterizing said sample to generate three-dimensional coordinates based on at least three fiduciary marks is performed using a three-dimensional optical microscope.

12. The method of claim 10 further comprising, characterizing said sample based on said three-dimensional coordinates using a scanning probe microscope.

13. The method of claim 12, wherein said sample is mounted in a holder.

14. The method of claim 13 further comprising, transferring said sample to a characterization tool configured to navigate to at least said location on said sample based on said three-dimensional coordinates and said at least three fiduciary marks.

15. The method of claim 10, wherein said aligning said sample is further based on a computer-aided design map.

16. The method of claim 15 further comprising, transferring the sample to a preparation tool configured to navigate to at least said location on said sample based on said three-dimensional coordinates and said at least three fiduciary marks.

17. The method of claim 16, wherein said at least three fiducial marks are located on said holder.

18. The method of claim 10, wherein said aligning and navigating is performed using a characterization tool selected from a group consisting of a contact-atomic force microscope, a scanning capacitive microscope, and a magnetic imaging tool.

19. A system for performing sample probing, comprising:
    a three-dimensional microscope configured to generate three-dimensional coordinates of a sample based on at least three fiducial marks; and
    a topography microscope configured to:
       receive said three-dimensional coordinates for said sample based on at least three fiducial marks;
       receive said sample mounted in a holder; and
       navigate to at least a location on said sample based on said at least three fiducial marks and said three-dimensional coordinates.

20. The system of claim 19, further comprising a preparation tool configured to receive said sample mounted in said holder and configured to navigate to at least said location on said sample based on said at least three fiducial marks and said three-dimensional coordinates.

* * * * *